United States Patent Office 3,518,851
Patented July 7, 1970

3,518,851
CONTROL MEANS FOR USE WITH A
POSITIVELY GUIDED TOOL
Herbert W. Boot and Allan C. Wood, Leicester, England, assignors to USM Corporation, Boston, Mass., a corporation of New Jersey
Filed Aug. 2, 1968, Ser. No. 749,862
Claims priority, application Great Britain, Aug. 12, 1967, 37,139/67
Int. Cl. C14b 1/48
U.S. Cl. 69—6.5                                         7 Claims

ABSTRACT OF THE DISCLOSURE

A control means for a shoe machine that performs irregular operations upon a shoe clamped in the machine and which has an operating tool guided through irregular motions by means of a template. The control means comprises a sensing means to determine which one of a pair of shoes has been clamped in the machine and a sensing means to determine which of a plurality of particular templates is presently in the machine. If the two sensing means do not coincide in their determination, the machine is not operable until coincidence is present.

BACKGROUND OF THE INVENTION

In the manufacture of shoes in which an outsole is cemented directly to the overlasted margin of the upper, it is necessary to carry out a roughing operation on the upper for a number of reasons. The first is to produce a smooth continuous sole attaching surface by removing of pleats, bulges or irregularities from the overlasted margin. A second reason and perhaps a more important reason for roughing the overlasted margin is that the cements commonly used do not adhere securely enough to the grain side of the upper unless it is roughened or abraded. Insofar as the adhering qualities of the abraded surface are concerned, it is not particularly important by what type of tool the roughing takes place, since practically all abrading tools produce a rough grainless surface from which the leather particles extend as minute fingers or fibers which provide excellent means for reception of the sole attaching cements.

Heretofore, roughing operations have for the most part been carried on manually by the use of relatively simple machines comprising a rotating wire brush against which the shoe is hand held. There have recently been introduced automatic roughing machines such as that disclosed in U.S. Pat. 3,233,438 to Hansen et al., granted Feb. 8, 1966.

The apparatus disclosed in the above noted patent comprises in general, a shoe support for supporting a lasted shoe, bottom uppermost, tool carrying means comprising two forwardly extending arms, mounted for pivotal movement about horizontal and vertical axes, and mounting two rotary roughing tools. The machine includes hydraulic means for moving the shoe support in a rectilinear path beneath the tools. Each of the pair of tools is guided by a sensing device arranged to cooperate with cam means in the form of a template which causes the tools to operate progressively along opposite marginal portions of the bottom of the shoe supported within the machine.

The template disclosed in the above noted patent has a three dimensional contour. A modification of the apparatus uses a flat template, which is supported beneath the shoe and includes means, operable in successive cycles of operation for turning the template supporting means through 180° about the axis so that the apparatus operates alternately on left and right shoes in successive cycles. This modification also includes an indicator for indicating to the operator whether the template is set for operation on a left or a right shoe.

In the hand roughing there was generally no particular problem as to whether the shoe was a right or a left since the operator moved the shoe lengthwise along the brush by hand, tilting and turning the shoe to present the complete overlasted margin of the shoe bottom to the brush. It is mandatory that the roughened area extend to the edge or featherline of the shoe but it is equally important that the roughened area not extend beyond the featherline. An extension of the rough beyond the featherline would not be covered by the sole and hence be visible on the finished shoe. With the operation done entirely by hand and the rough guided by the eyes of an expert workman, there was relatively little danger of a major error being made in the roughing.

With the use of an automatic roughing machine, such as that disclosed in the above noted patent and particularly in the use of the modification, is the danger that the operator would attempt to rough a left shoe whereas the template which guides the roughing tools would be for a right shoe. It is obvious that the resulting rough would be inaccurate and ruin the shoe as well as possibly overstress the machine, causing a breakdown.

It is to be understood that whereas the above discussion refers to the roughing of the bottom portion of a lasted shoe, the principles as set forth by present invention are not limited to the process of roughing shoe bottoms but could well be applied to any operation which required an irregular pattern to be generated upon a work surface. For example, the invention could equally be used in generating a decorative pattern upon a wall-board or perhaps for getting a knife to cut patterns out of a stack of many layers of cloth in preparation for making articles of clothing.

Accordingly, it is an object of the present invention to provide a control means for use upon any machine which has a tool designed to cut an irregular shape and which is guided by a template or some other similar control means, including a sensing device to determine the pattern of the control means and a sensing device to determine the nature of the object upon which the operation is to be done and if the two determinations do not coincide, prevent the operation of the machine.

It is another object of this invention to produce a substantially automatic shoe bottom roughing machine in which the roughing tool is positively guided with respect to the shoe by means of a two-dimensional template.

In accordance with this object and as a feature of the invention there is provided a sensing means to determine which side of the template is in a position to control the roughing tool and which shoe, right or left, is in position to be operated upon and if the two do not coincide, to prevent further operation of the machine until coincidence is achieved.

In accordance with the objects and as another feature of the invention, there is provided a means to reverse or change the template to provide coincidence between the template and the object to be operated upon.

The above and other features of the invention including various novel details of construction and combination of parts will now be more particularly described with reference to the accompanying drawings and pointed out in the claims. It will be understood that the particular roughing machine embodying the invention is shown by way of illustration only and not as a limitation of the invention. The principles and features of this invention may be employed in varied and numerous embodiments without departing from the scope of the invention.

The shoe carrying portion of the machine is similar to that described in U.S. Pat. No. 3,233,438 to Hansen et al., noted above. The illustrative machine includes an improvement over the Hansen machine in that a two-dimensional contoured template rather than a three-dimensional contoured template is used to guide the roughing tools. A different design of clamping apparatus is used for holding the shoe in position within the machine. Other than these two variations, the description and operation as set forth in the above noted patent is applicable to this structure and will not be described in detail.

Figure 1:
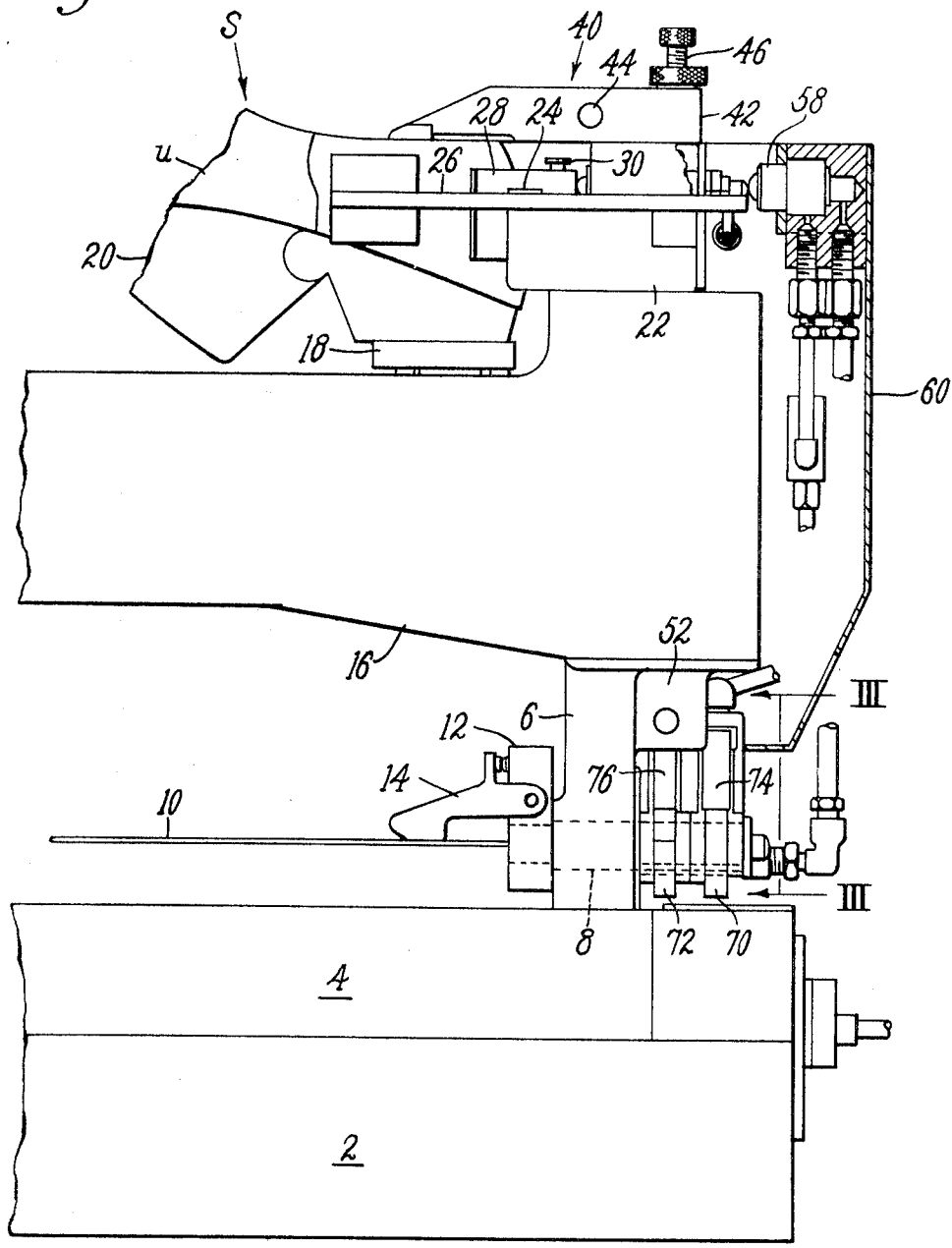
FIG. 1 is a side elevation of the shoe and template holding apparatus of an illustrative bottom roughing machine.

The machine shown in FIG. 1 comprises a table 2 upon which a carriage 4 is slidably mounted so that the shoe carried by the mechanism can be moved beneath the rotary brushes.

Upstanding from the table 2 is a column 6 which has a shaft 8 extending therethrough and upon which shaft is mounted the two-dimensional template 10. Since the template is two-dimensional it can be used for either right or left shoes by simply rotating the shaft through 180° so that the opposite surface of the template is exposed to the cam followers in much the same fashion as described in the above noted patent. Likewise mounted upon the column 6 is a bracket 12 upon which is mounted a pivotable latch member 14 for assuring that the template remains in operative position once the machine is in operation assuring a consistent rough.

Rigidly mounted on the upper end of the column 6 is a bracket 16 upon which is mounted a support plate 18 through which the last pin (not shown) extends up into the last 20 upon which is mounted the upper U of a shoe S. To the rear of the bracket 16 is mounted a support frame 22 including a pivot 24 for a pair of arms 26 which hold the shoe in position from opposite sides. Likewise mounted upon the support frame 22 is a pivotal heel clamp 28 seen best in FIG. 2. The heel clamp 28 is pivotable about a single pivot 30 mounted to the upper portion of the support frame 22. Further mounted on the support frame 22 is a foot 40 which comprises a pair of arms 42 which are vertically pivotable about a pin 44 to the extent allowed by the adjustable stop screw 46. The combination of the last pin, the pair of arms 26, the heel clamp 28 and the foot 40 secure a shoe in the machine during the operation.

Figure 2:
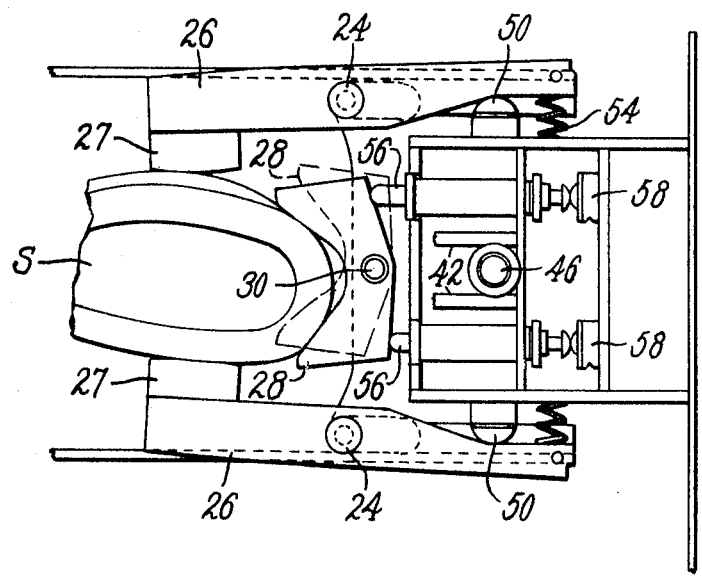
FIG. 2 is a plan view of the shoe holding apparatus and sensing means with a shoe in position.

Referring now to FIG. 2 which is a plan view of the shoe heel holding mechanism, it can readily be seen that the shoe S is held in a fixed position by the force generated by a pair of pads 27 mounted upon the outward end of the arms 26 which are forced to pivot about the pins 24 by a pair of plungers 50 controlled by a cylinder 52, the lower end of which can be seen in FIG. 1. A spring 54 urges the rearward end of the arms 26 towards each other so that when a shoe is to be placed or removed in the machine, the arms 26 are separated at the point of contact with the shoe and will not interfere with the shoe movement.

Upon the shoe being properly placed in the machine the operator actuates cylinder 52 which through a cam mechanism (not shown) forces the plungers 50 outwardly against the rearward end of the arms, thus engaging the pads 27 with the side portions of the lasted shoe upper.

The rear portion of the heel is engaged in the V-shaped notch of the heel clamp 28.

The heel clamp 28 is shown in solid line for the position for a left shoe and in dotted line in position for supporting a right shoe. It is to be noted that immediately behind the heel clamp 28 and abutting the rearward surface thereof is a pair of plungers 56 which are spring biased toward the heel clamp and thus are directly responsive to the shoe that is in position to be operated upon. The rearward end of each plunger 56 contacts a valve 58 for purposes to be later described.

Referring again to FIG. 1, it is to be noted that the valves 58 and their associated circuitry are protected by means of a shield 60.

Figure 3:
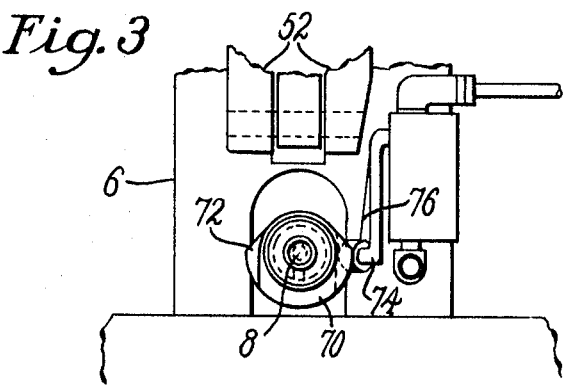
FIG. 3 is a view along line III—III of FIG. 1 showing the template sensing means.

FIG. 3 shows the end-on view of the shaft 8 which has mounted thereon a pair of cams 70 and 72 which are contacted by a pair of cam followers mounted upon yieldable arms 74, 76, designed to operate a pair of valves, one of which is closed for either possible position of the template 10. As shown in FIG. 3, the template is in proper position for work to be done on a left shoe and the cam 70 causes pivoted arm 74 to be depressed, thus actuating the associated valve. If the template were turned to 180°, the cam 72 would cause pivoted arm 76 to be depressed, thus actuating its associated valve.

Figure 6:
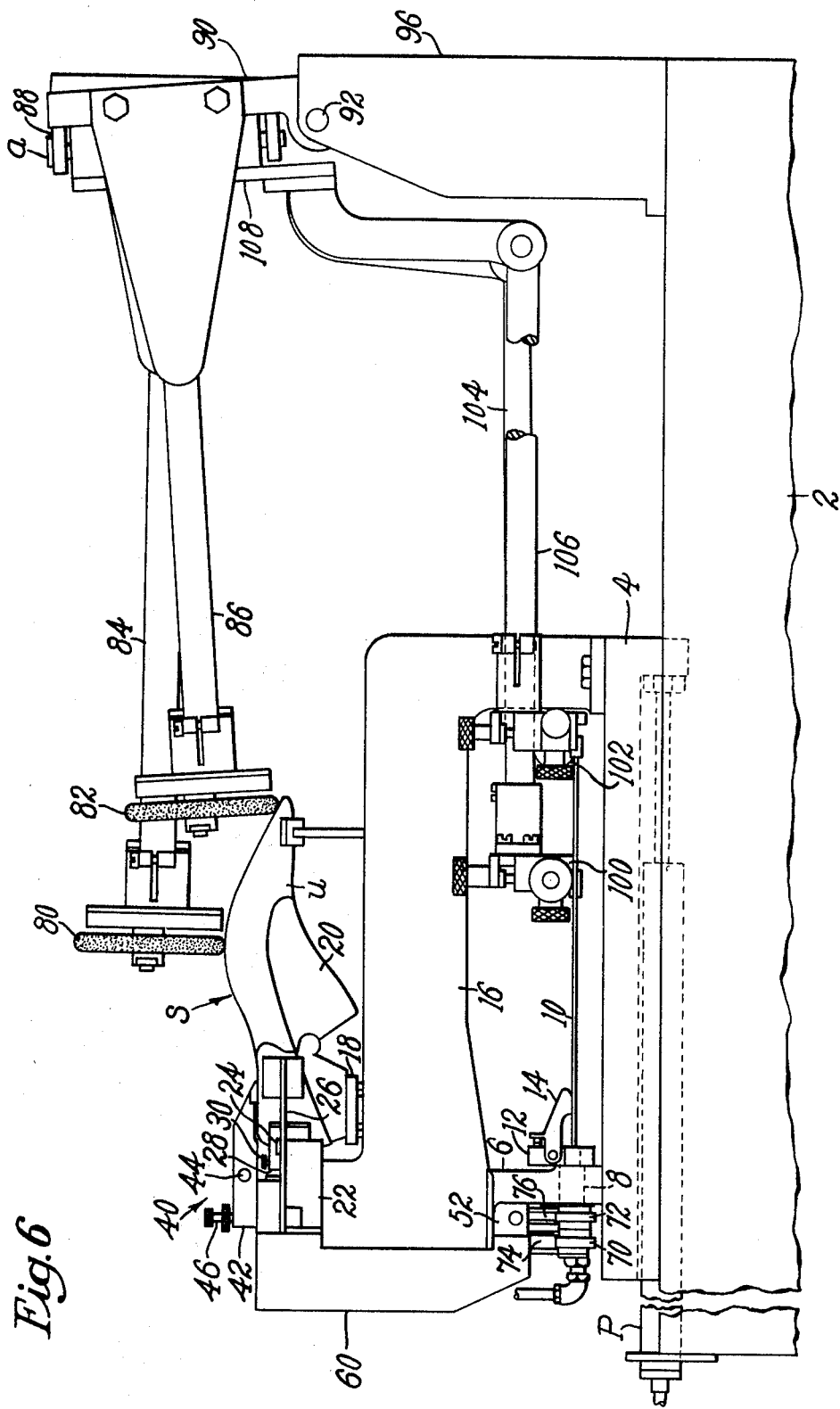
FIG. 6 is a side elevation with parts broken away of an illustrative bottom roughing machine viewed from the side opposite FIG. 1.

The overall arrangement of a bottom roughing machine including the present invention is illustrated in FIG. 6, which may be viewed in conjunction with the figures previously described, and particularly FIG. 1.

A pair of rotatable roughing tools 80 and 82 movably engageable with the bottom of shoe upper U are carried on a pair of forwardly extending rotatable arms 84 and 86, respectively. Arms 84 and 86 are mounted for pivotable movement about horizontal axes represented by dash line $a$ running through shaft 88 carried by frame 90. Additionally, arms 84 and 86 are mounted for pivotable movement about a vertical axis running through pin 92 which also serves to attach frame 90 in generally upstanding position relative to support member 96. Support member 96 in turn is positioned securely onto the carriage 2.

A pair of follower heads 100 and 102 movably engageable with template 10, the latter acting as a cam for the heads, are carried on arms 104 and 106, respectively. The arms 104 and 106 are connected to the roughing tool carrying arms 84 and 86, through attaching plates, only one of which, 108, is shown, registered to tool carrying arms 84 and 86.

For the purpose of moving table 4 relative to frame 2, a hydraulic piston P is provided.

OPERATION OF THE ILLUSTRATIVE MECHANISM

The cycle of the operation of the control means will now be described with reference to FIGS. 4 and 5, which in combination comprise a pneumatic diagram for the illustrative mechanism.

In a cycle of operation of the apparatus the operator first assures that a template T corresponding in respect to size and style of the shoe to be operated upon is located in the template supporting means. If the mechanism was designed to work on an object other than a shoe, the template, obviously, would correspond to the pattern of operation desired.

The operator then observes the indicator, TI (FIG. 4) of the illustrative apparatus to see whether the template is set for an operation on a left or a right shoe. When the template supporting means is in its first position and the template T is set for a left operation, valve VL2, FIG. 4 is moved against its spring out of its position shown in FIG. 4. Similarly, when the template T is set for a right shoe operation, valve VR4, FIG. 4 is moved against its spring into the position shown in FIG. 4, i.e., the valves as shown in the pneumatic diagram are for a right shoe operation.

Figure 5:
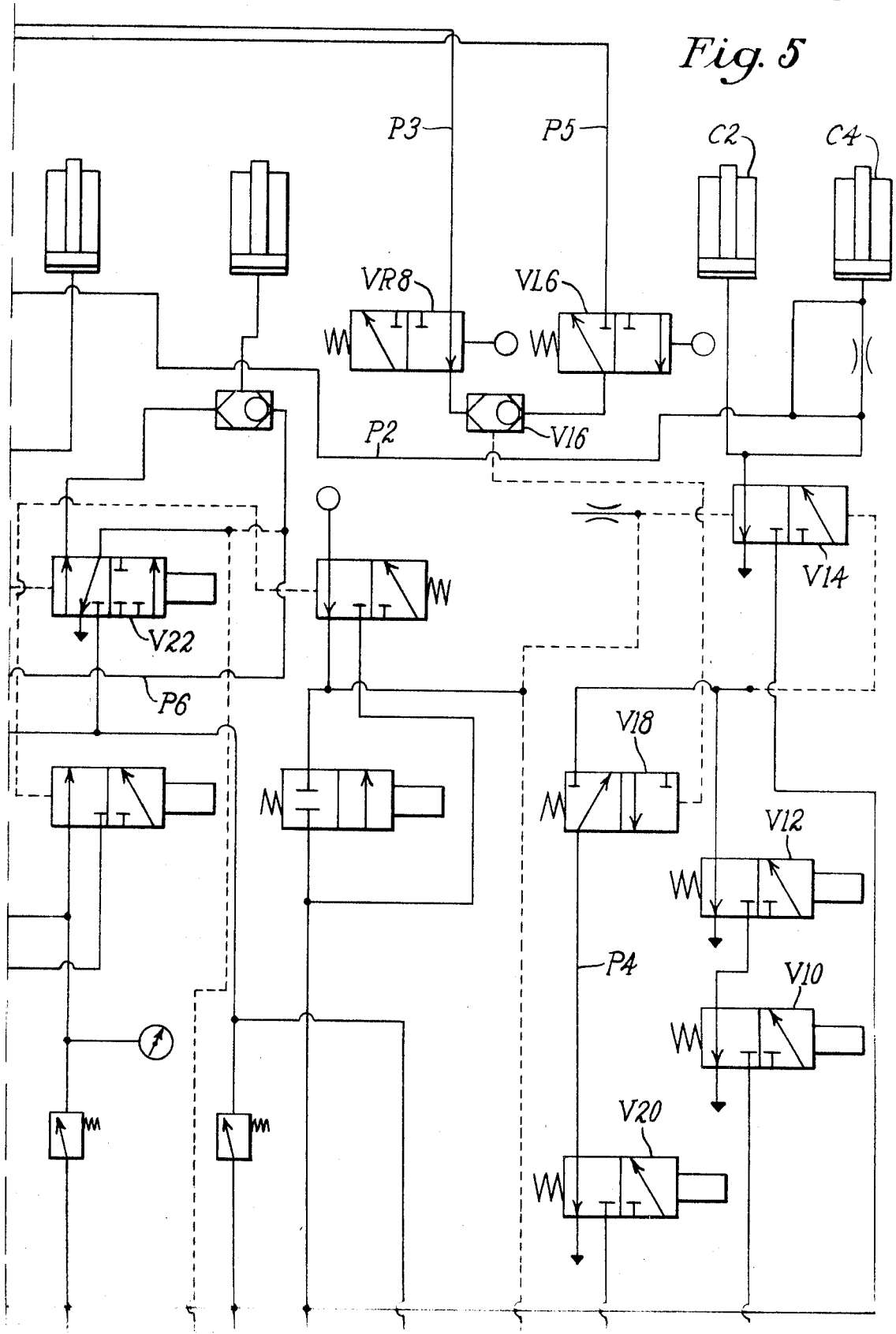

The operator then places a shoe in the shoe support, its toe-end portion thus operating valve V10, FIG. 5, and he manually operates valve V12, FIG. 5, to allow air under pressure to operate valve V14, FIG. 5. Air from the main pressure line, P1, thus passes through valve V14 to piston and cylinder arrangements C2 and C4, FIG. 5, whereby in sequence the plate 18, FIG. 1, urges the shoe against the foot 42, FIG. 1, and the arms 26 are urged against the side of the shoe.

Assuming that the shoe is a right shoe, the indicator TI, indicating that the template is set for a right operation and valve VR4 being actuated, engagement of the heel end portion of the lasted upper by the heel clamp 28 causes the heel clamp to be moved to its second position, dashed lines, FIG. 2, and this causes valve VR8 to be actuated by the appropriate plunger 56. Air under pressure is thus admitted from the line leading to piston and cylinder arrangements C4 along line P2 through the valve VR4, FIG. 4, along line P3 and through valve VR8, FIG. 5, to valve V16, FIG. 5. Air under pressure passing through valve V16 operates pilot valve V18, FIG. 5, to allow air under pressure from valve V12, FIG. 5, to pass along line P4 to valve V20, FIG. 5. The illustrative apparatus is now ready for a cycle of operation to be performed upon manual operation of valve V20 by the operator.

Figure 4:
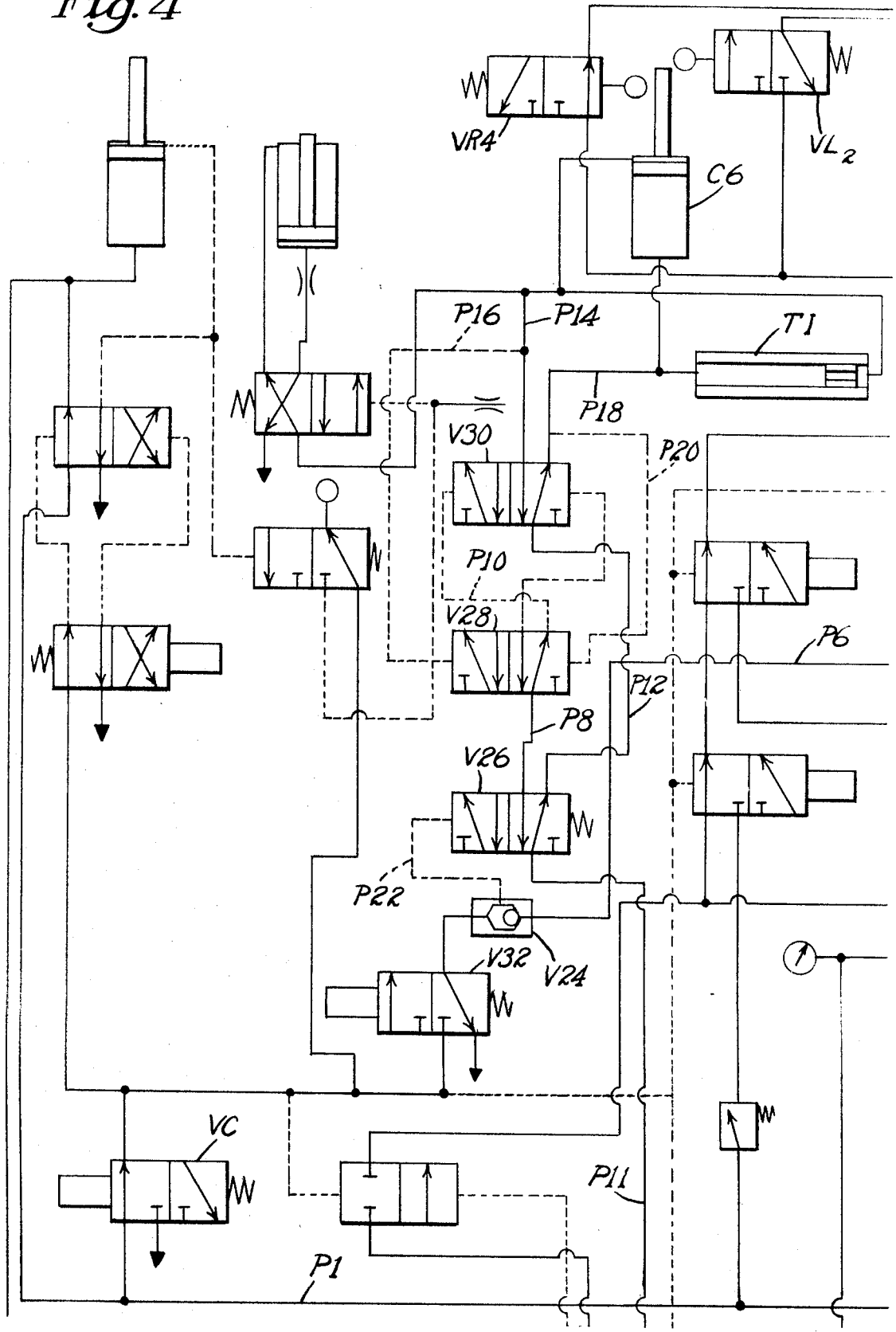
FIGS. 4 and 5 in combination show the pneumatic circuitry for the operation of the sensing device in the illustrative machine.

If the template T is set for a left operation, valve VL2, FIG. 4, is operated and when a left shoe is placed in the shoe support, valve VL6, FIG. 5, is also operated to allow air under pressure to pass from line P2 along line P5 to valve V16, FIG. 5, and thus to enable pilot valve V18, FIG. 5, to be operated as aforesaid. If, however, the template is set for a left operation and a right shoe is placed in the shoe support or vice versa, no air will be allowed to pass through to valves V16 and V18 and thus valve V20 will not operate to initiate the type of operation of the illustrative apparatus.

Towards the end of the cycle of operation of the illustrative apparatus, valve V22, FIG. 5, is tripped as the second brush reaches the end of its traverse to cause the brush to be raised and also to cause the shoe support to return to its initial position. In the illustrative apparatus, operation of the valve V22 also allows air under pressure to pass along line P6 through the valve V24, FIG. 4, to cause pilot valve V26, FIG. 4, to move from its position shown in FIG. 4 to allow air under pressure to pass through V26 along line P8 through the valve V28, FIG. 4, and along line P10 to pilot valve V30, FIG. 4, which is thus moved from its position shown in FIG. 4. Later in the cycle, valve V22 is reset upon operation of the control valve VC, FIG. 4, valve V26 returns to its initial position and air from the main line P1 passes through line P10 through valve V26 along line P12 through valve V30 and along line P14 to the upper end of piston and cylinder arrangements C6, FIG. 4, as well as the indicator TI, thus to turn the template T through 180° and change the position of the indicator to indicate the opposite shoe. At the same time air from line P14 passes along pilot line P16 to valve V28, FIG. 4, to cause it to move to the left, FIG. 4, in readiness for the next cycle of operation of the illustrative apparatus.

In the next cycle of operation, the same sequence of operations takes place except that valve V28, FIG. 4, is now positioned to allow air under pressure to cause valve V30 to move back to its position shown so that the air from line P12 now passes along line P18 to the lower end of piston and cylinder arrangements C6 and to the indicator TI and also along the pilot line P20 to move the valve V28 back to its position shown.

Thus, for successive signals received from the valve V22, the template T is caused to be reversed through 180°. If, as above referred to, the template setting and a shoe placed in the shoe support do not correspond to one another, the template T is reversed by operation of the manually operable valve V32, FIG. 4, which allows air under pressure to pass along line T22 to valve V26.

It will thus be apparent that the illustrative apparatus cannot now be used when the template is in one setting for operating on an opposite shoe means, however, being provided whereby the template can be simply and quickly reversed so as not to impede longer than necessary the operation of the apparatus.

It is to be understood that the present invention is by no means limited to the particular construction shown in the drawings, but also comprises any modifications within the scope of the appended claims.

Having thus described our invention, what we claim as new and desire to secure by Letters Patent of the United States is:

1. In a machine for performing operations upon a bottom of a lasted shoe upper clamped within the machine comprising means to clamp the shoe upper in position for the operation, shoe sensing means mounted within the machine adjacent the shoe to detect which one of a pair of shoe uppers is clamped in position, an operating tool mounted within the machine, means functionally connected to the tool to guide the tool during the operations upon the shoe including following means engageable with a reversible template and means to prevent operation of the machine if the template and the shoe upper do not correspond.

2. A machine as in claim 1 wherein the shoe sensing means comprises a member contacted and moved by and in accordance with the shoe upper clamped in position to be operated upon.

3. A machine as in claim 1 wherein the shoe upper is clamped upon a moving table and including means to move the table and clamped shoe upper beneath the operating tool.

4. A machine as in claim 1 wherein the template is flat and mounted upon a rotatable shaft enabling the template to be reversed and allowing both faces of the template to be used as guiding means.

5. In a machine for performing peripheral operations upon one of a pair of lasted shoe upper bottoms comprising an operating tool and a single reversible template to guide the tool around the periphery of the shoe upper bottom, including means to clamp the shoe upper in the machine in position to be operated upon and means to support the template, the improvement comprising means to detect which of the pair of shoe uppers is in position to be operated upon, means to indicate which template is in the tool guiding position and means preventing operation of the machine unless the template and the shoe upper in operating position correspond.

6. A machine as in claim 5 wherein the template is flat and mounted upon a shaft permitting rotation through 180° and use of the reverse side for guiding the tool when the object is the second of a pair.

7. A machine as in claim 5 wherein the shoe upper and the template are mounted upon a movable table and including means to move the table beneath the operating tool.

References Cited

UNITED STATES PATENTS

| | | | |
|---|---|---|---|
| 2,388,384 | 11/1945 | Card | 69—6.5 |
| 2,733,588 | 2/1956 | Stacey et al. | 69—6.5 |
| 3,233,438 | 2/1966 | Hansen et al. | 69—6.5 |
| 3,371,510 | 3/1968 | Dunlap | 69—6.5 |
| 3,400,561 | 9/1968 | Bechtold | 69—6.5 |

ALFRED R. GUEST, Primary Examiner